US011220963B2

(12) United States Patent
Pedersen et al.

(10) Patent No.: US 11,220,963 B2
(45) Date of Patent: Jan. 11, 2022

(54) SYSTEM FOR IMPROVED ENGINE BRAKING

(71) Applicant: VOLVO TRUCK CORPORATION, Gothenburg (SE)

(72) Inventors: Jens Pedersen, Askim (SE); Anders Mohlin, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/493,515

(22) PCT Filed: Mar. 16, 2017

(86) PCT No.: PCT/EP2017/056219
§ 371 (c)(1),
(2) Date: Sep. 12, 2019

(87) PCT Pub. No.: WO2018/166597
PCT Pub. Date: Sep. 20, 2018

(65) Prior Publication Data
US 2021/0131358 A1    May 6, 2021

(51) Int. Cl.
*F02D 13/04* (2006.01)

(52) U.S. Cl.
CPC .................. *F02D 13/04* (2013.01)

(58) Field of Classification Search
CPC .... F02D 41/12; F02D 9/06; F02D 2009/0242; F02D 13/04; F01L 13/065; F01N 2590/08; F01N 2240/36
See application file for complete search history.

(56) References Cited

U.S. PATENT DOCUMENTS 8,584,644 B2 *  11/2013  Ma ...................... F02D 13/0226
                                                  123/179.3
2003/0234378 A1 *  12/2003  Hartley .................. F16K 1/165
                                                  251/307
(Continued)

FOREIGN PATENT DOCUMENTS

| CN | 1310290 A | 8/2001 |
| CN | 102159812 A | 8/2011 |
| CN | 103375276 A | 10/2013 |
| CN | 106208812 A | 12/2016 |

(Continued)

OTHER PUBLICATIONS

International Search Report dated May 19, 2017 in International Application No. PCT/EP2017/056219.
(Continued)

*Primary Examiner* — Joseph J Dallo
*Assistant Examiner* — Kurt Philip Liethen
(74) *Attorney, Agent, or Firm* — Venable LLP; Jeffri A. Kaminski

(57) ABSTRACT

The invention provides an operation system for a vehicle, comprising an internal combustion engine (1) comprising a cylinder (301, 302), and an exhaust guide (500, 501, 502) being arranged to guide a gas flow from the cylinder (301, 302) to the atmosphere, wherein the vehicle operation system further comprises a pneumatic system (660), and an air conduit (661) connecting the pneumatic system (660) with the exhaust guide (500, 501, 502) for allowing a flow of compressed air from the pneumatic system into the exhaust guide (500, 501, 502).

6 Claims, 6 Drawing Sheets

(56) References Cited

U.S. PATENT DOCUMENTS

| | | | | |
|---|---|---|---|---|
| 2005/0182553 | A1* | 8/2005 | Miller | F02D 41/0087 |
| | | | | 701/103 |
| 2006/0131950 | A1* | 6/2006 | Larson | B60T 8/00 |
| | | | | 303/7 |
| 2007/0246008 | A1* | 10/2007 | Gerum | F02B 21/00 |
| | | | | 123/316 |
| 2008/0017391 | A1* | 1/2008 | Lenz | A62C 5/02 |
| | | | | 169/24 |
| 2010/0122687 | A1* | 5/2010 | Gerum | F02D 13/0276 |
| | | | | 123/327 |
| 2011/0041496 | A1* | 2/2011 | Mayr | F02B 21/00 |
| | | | | 60/611 |
| 2011/0289914 | A1 | 12/2011 | Afjeh | |
| 2014/0261310 | A1* | 9/2014 | Troisi | F02D 9/06 |
| | | | | 123/324 |
| 2018/0363567 | A1* | 12/2018 | Mohlin | F02B 37/22 |

FOREIGN PATENT DOCUMENTS

| | | |
|---|---|---|
| DE | 102015200462 A1 | 7/2016 |
| EP | 1277929 A2 | 1/2003 |
| EP | 1550796 A1 | 7/2005 |
| EP | 2360362 A1 | 8/2011 |
| KR | 20080012042 A * | 2/2008 |
| KR | 20080012042 A | 2/2008 |

OTHER PUBLICATIONS

Written Opinion dated Mar. 8, 2019 in International Application No. PCT/EP2017/056219.

European Communication pursuant to Article 94(3) dated Aug. 20, 2020 in corresponding European Application No. 17711156.4, 4 pages.

China Office Action dated Mar. 3, 2021 in corresponding China Patent Application No. 201780088303.5, 14 pages.

* cited by examiner

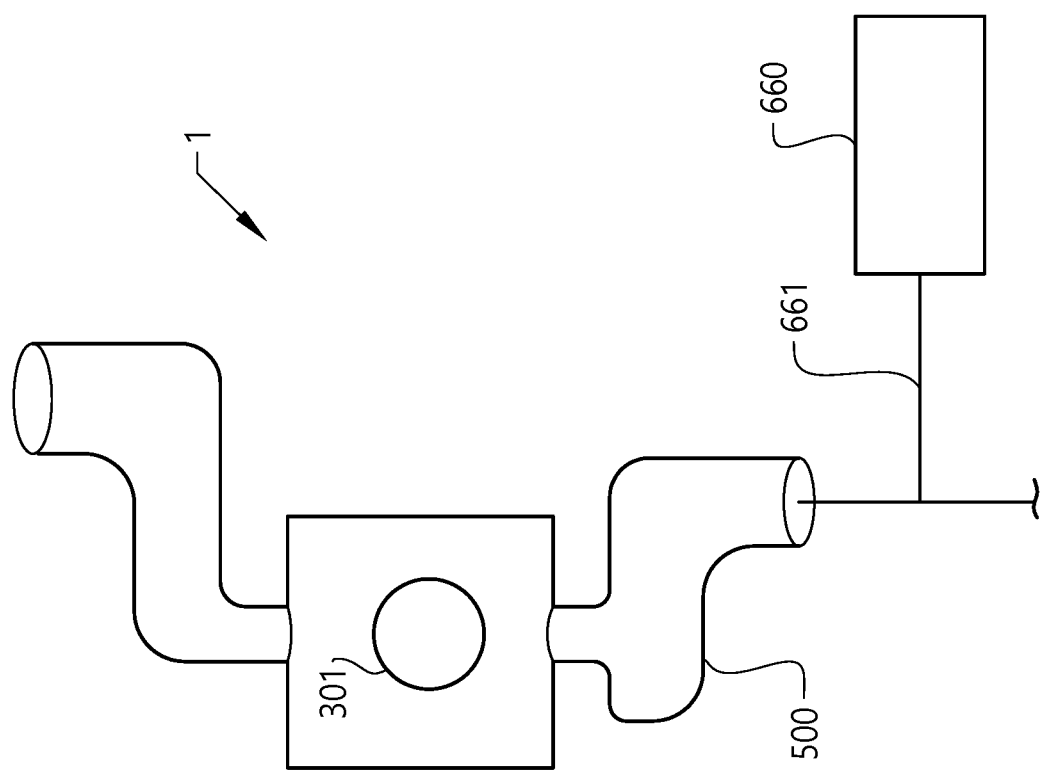

SYSTEM FOR IMPROVED ENGINE BRAKING

TECHNICAL FIELD

The invention relates to an operation system for a vehicle, comprising an internal combustion engine, a method of controlling an operation system of a vehicle, a computer program, a computer readable medium, a control unit, and a vehicle.

The invention can be applied in heavy-duty vehicles, such as trucks and buses. Although the invention will be described with respect to a heavy-duty vehicle, the invention is not restricted to this particular vehicle, but may also be used in other vehicles such as cars.

BACKGROUND

It may be desirable to provide, in particular in heavy-duty vehicles, a powerful engine braking function, e.g. in long downhill road stretches with heavy loads. A problem is that the engine braking process, by its conversion of braking torque to heat via air compression in the engine, may increase the temperature of exhaust after treatment devices such a filters and catalysts, to a level at which these device are damaged. As a result the engine braking power may have to be controlled so as to be decreased.

EP1550796 A1 suggests for controlling the temperature of exhaust gases in an engine, guiding air from an engine air intake line, downstream of a turbocharger compressor, into an exhaust line, upstream of a turbocharger turbine. However, this suggestion requires a pressure drop from the air supply line to the exhaust gas line, and this is not the case in all operational conditions. The suggestion also requires that the turbocharger can deliver the requested air flow at operational conditions where the air transport to the exhaust line is desired, and this is not always the case either.

DE102015200462 discloses an exhaust aftertreatment system for an internal combustion engine, wherein automotive compressed air can be introduced into the exhaust system upstream of a catalyst to assist an exothermic chemical reaction on the catalyst.

EP2360362A1 discloses a pressure accumulation system for an internal combustion engine, which can prevent the exhaust pressure from excessively increasing during engine braking.

SUMMARY

An object of the invention is to improve, in the operation of internal combustion engines, the control of the temperature of exhaust after treatment devices, e.g. for reducing for example NOx or soot content in exhaust gases.

This object is reached with a system according to claim 1. Thus, the invention provides an operation system for a vehicle, comprising an internal combustion engine comprising a cylinder, and an exhaust guide being arranged to guide a gas flow from the cylinder to the atmosphere, wherein the vehicle operation system further comprises a pneumatic system, and an air conduit connecting the pneumatic system with the exhaust guide for allowing a flow of compressed air from the pneumatic system into the exhaust guide.

It is understood that the cylinder is provided with a piston connected to a rotatable crankshaft for propulsion of the vehicle. Preferably the pneumatic system and the air conduit are separate from an air guide arranged to guide an air flow from the atmosphere to the cylinder. It is also understood that the engine may be provided with any suitable number of cylinders, e.g. one, four, five, six or eight, in any suitable configuration, such as an inline or a V configuration.

The invention may serve to cool the exhaust gas stream for brief periods of time during which a risk of overheating exhaust system components would otherwise exist, limiting engine braking performance. The pneumatic system air may be used to inject comparatively cool compressed air to dilute the exhaust gas stream, lowering its temperature. Since air is usually readily available in a pneumatic system with a pressure higher than the pressure in the exhaust guide at any operational condition, e.g. at engine braking, air can be introduced to the exhaust guide to cool exhaust after treatment devices therein without any restriction caused by the operational condition of the engine. It should be noted that the invention is not only applicable to engine brake operations, but also to positive power operations, e.g. in situations with a high torque and a low engine rotational speed, or with diesel particulate filter regeneration.

By the reliable and effective cooling capacity provided by the invention, an increase of engine braking power may be provided without the risk of overheating the exhaust after treatment system. Simulations done by the inventors indicate that the invention may increase the engine brake power by about 10% on a heavy duty vehicle diesel engine in production, where the pneumatic system utilizes an air compressor with a capacity normally available in heavy duty vehicles. The invention may be used to increase engine braking power at all engine speeds.

Preferably, the system comprises an air valve for selectively controlling the flow of compressed air from the pneumatic system into the exhaust guide. Thereby, the provision of the pneumatic system air may be effectively controlled to be adapted to the requirements of the engine operation.

An exhaust after treatment device, e.g. a catalytic converter or a particulate filter, may be located in the exhaust guide, downstream of a junction of the air conduit and the exhaust guide. Thereby, the cooling effect of the pneumatic air from the air conduit may the effectively secured. It is understood that the junction of the air conduit and the exhaust guide is at a location at which the compressed air is allowed into the exhaust guide, or where the air conduit releases air into the exhaust guide.

Preferably, the system comprises means for determining the temperature of the exhaust after treatment device. Thereby, the provision of the pneumatic system air may be effectively controlled to be adapted to the cooling requirements of the exhaust after treatment device.

The pneumatic system may comprise, or be, a vehicle air brake system. In some embodiments, the pneumatic system may comprise, or be, a vehicle air suspension system. Since in heavy duty vehicles such systems are normally provided with relatively powerful air compressors, the supply of air to the exhaust guide may be secured for the needs of the engine operation.

Preferably, where a turbine is located in the exhaust guide, a junction of the air conduit and the exhaust guide is located upstream of the turbine. Where the engine comprises an air guide arranged to guide an air flow from the atmosphere to the cylinder, the turbine may form a part of a turbocharger of the engine, comprising a compressor arranged to compress air in the air guide, the turbine being arranged to drive the compressor. It is understood that thereby the turbine is normally rotationally rigidly connected to the compressor for converting energy of the exhaust gas flow to a rotational movement of the compressor. By providing the junction of the air conduit and the exhaust guide upstream of the turbine, the air introduced from the pneumatic system may be used to increase the work of the turbocharger, which in engine brake modes may increase the braking work due to an increased turbo charger rotational speed giving an increased air mass flow and an increased boost pressure. Also, the injected air may be cooled as it passes through the turbine.

In some embodiments, the junction of the air conduit and the exhaust guide may be located downstream of the turbine. Also in such embodiments, engine braking work may be increased due to the capacity to securely avoid overheating of an exhaust treatment system by the air introduction.

It should be noted that the turbine may in some implementations of the invention be one of a plurality of turbines, e.g. where a turbocharger comprising the turbine is a two-step turbocharger or a sequential turbocharger. Further, the invention may be implemented where the engine comprises a plurality of cylinders, the exhaust guide presents two exhaust guide branches, each arranged to guide exhaust gases from a respective sub-group of the cylinders, and a turbocharger of the engine presents a bi-turbo configuration.

In some implementations of the invention, a turbine of a turbo compound device is located in the exhaust guide, a junction of the air conduit and the exhaust guide being located upstream of the turbine. It should be noted that the invention is also applicable to naturally aspirated engines.

Preferably, an adjustable exhaust flow restriction element is arranged to restrict the flow through the exhaust guide, a junction of the air conduit and the exhaust guide being located upstream of the exhaust flow restriction element. As exemplified below, the system may comprise further or alternative devices for providing an engine braking torque.

A turbine may as suggested be located in the exhaust guide. In addition, an adjustable exhaust flow restriction element may be arranged to restrict the flow through the exhaust guide, the exhaust flow restriction element being located downstream of the turbine. Where the engine comprises an air guide arranged to guide an air flow from the atmosphere to the cylinder, the system may comprise a turbocharger comprising a compressor arranged to compress air in the air guide, and the turbine which is arranged to drive the compressor. In such embodiments, the possibility to introduce pressurized air from the pneumatic system is particularly advantageous. The reason is that during engine braking, the pressure increase caused by the exhaust flow restriction element reduces or eliminates the work of the turbocharger, so that the air guide pressure is relatively low, whereby said known solution to guide air from the air guide to the exhaust guide to cool exhaust after treatment devices would not work. However, the possibility provided by the invention to introduce pressurized air from the pneumatic system will allow cooling of exhaust after treatment devices even if the turbocharger work is low or non-existent. Also, as stated where the junction of the air conduit and the exhaust guide is located upstream of the turbine, the air introduced from the pneumatic system may be used to increase the work of the turbocharger, which in engine brake modes may increase the braking work due to an increased turbo charger rotational speed giving an increased air mass flow and an increased boost pressure.

In some implementations of the invention, a turbine of a turbo compound device is located in the exhaust guide, and an adjustable exhaust flow restriction element is arranged to restrict the flow through the exhaust guide, the exhaust flow restriction element being located downstream of the turbine.

The object is also reached with a method of controlling an operation system of a vehicle, comprising an internal combustion engine for propulsion of the vehicle, the engine comprising a cylinder arranged to compress air from the atmosphere received via an air guide, the engine further comprising an exhaust guide arranged to guide a gas flow from the cylinder to the atmosphere, the method comprising controlling the engine to provide a braking torque,
and controlling, during the control of the engine to provide a braking torque, an air valve to allow a flow of compressed air from a compressed air source other than the cylinder via an air conduit into the exhaust guide.

Thereby, an exhaust gas after treatment system located in the exhaust guide may be cooled by the air from a compressed air source, to avoid the exhaust gas after treatment system being overheated during the engine braking operation. The compressed air source is preferably a pneumatic system of the operation system; as suggested above, thereby, the cooling capacity may be secured independently of the operational condition of the engine, and the engine braking power may be increased.

Preferably, the method comprises determining a temperature of an exhaust after treatment device located in the exhaust guide, wherein controlling the air valve comprises controlling the air valve in dependence on the determined exhaust after treatment device temperature. As suggested, thereby the provision of the compressed air source air may be effectively controlled to be adapted to the cooling requirements of an exhaust after treatment device in the exhaust guide.

Controlling the engine to provide a braking torque may comprise controlling an adjustable exhaust flow restriction element so as to restrict the flow through the exhaust guide. Such a control may increase the exhaust back pressure, thus increasing the engine braking torque.

The object is also reached with a computer program, a computer readable medium, a control unit, and a vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 6 is a schematic drawing of a vehicle operation system according to yet another embodiment of the invention.

DETAILED DESCRIPTION OF EXAMPLE EMBODIMENTS OF THE INVENTION

Figure 1:
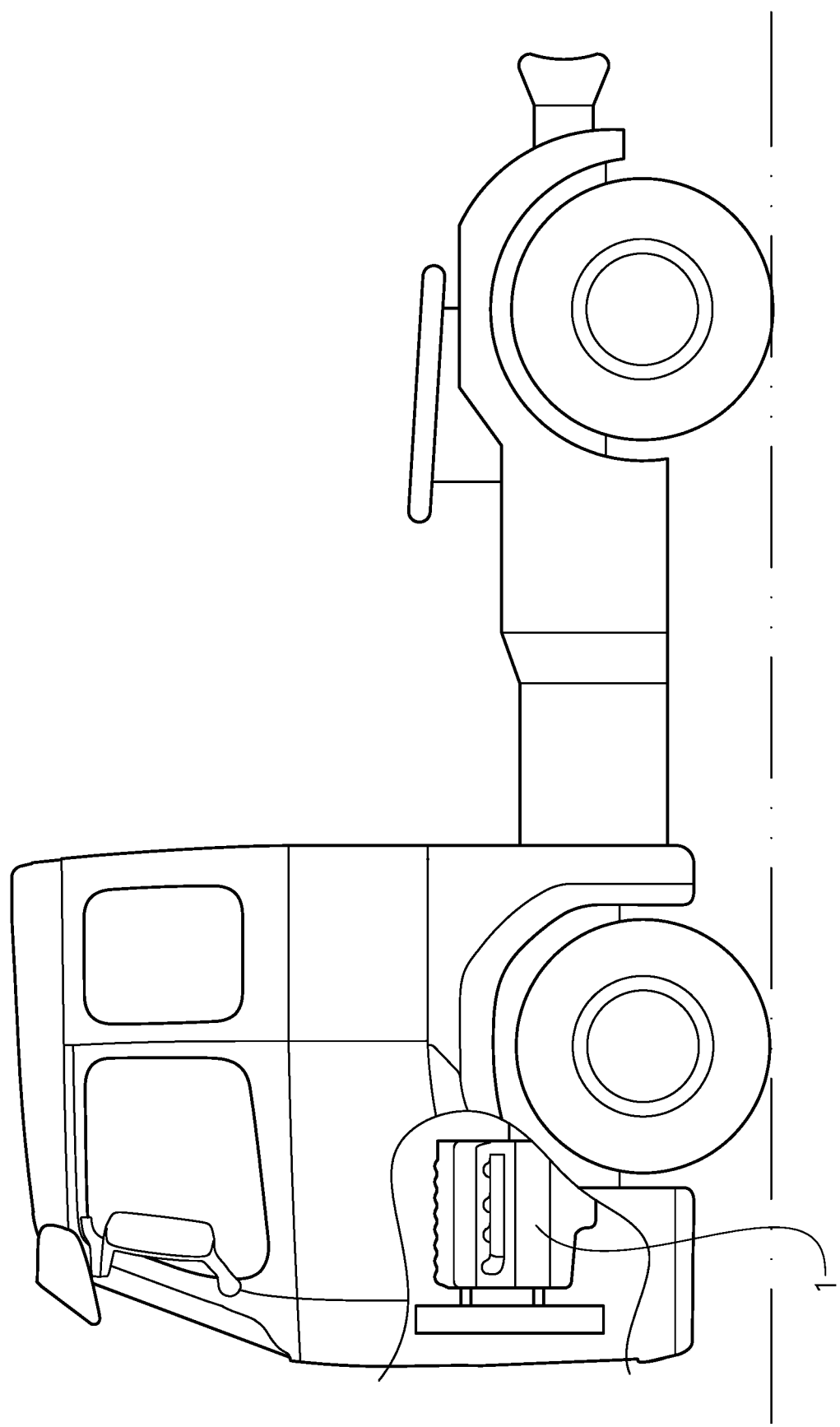
FIG. 1 is a side view of a vehicle in the form of a truck.

FIG. 1 shows a vehicle in the form of a truck, or a tractor for a semitrailer. It should be noted that the vehicle can be of a variety of alternative types, e.g. it may be a car or a bus. The vehicle comprises a four-stroke internal combustion engine 1. It should be noted that the invention is equally applicably to a variety of engine types, such as two-stroke engines, engines adapted for cycles with six strokes, camless engines etc.

Figure 2:
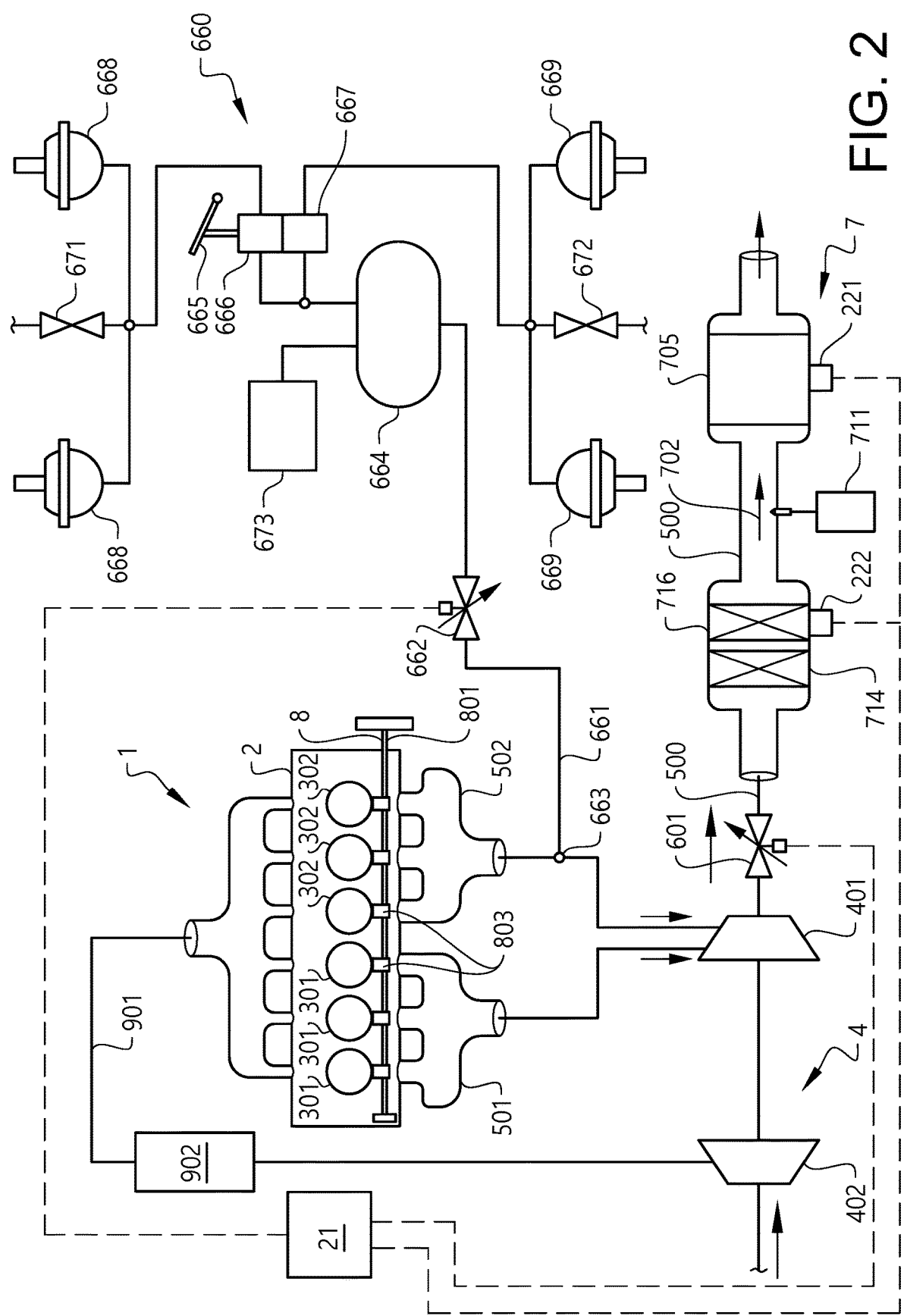
FIG. 2 is a schematic drawing of an operation system in the vehicle in FIG. 1, comprising an internal combustion engine.

FIG. 2 shows an operation system of the vehicle, comprising the engine 1. The engine comprises in this example six cylinders 301, 302 arranged in a line. Each cylinder 301, 302 comprise a piston connected to a rotatable crankshaft (not shown). The engine 1 is oriented in the vehicle such that line of cylinders is parallel with the direction of straight travel of the vehicle. It should be noted however that in alternative embodiments the orientation of the engine may have another orientation in the vehicle. For example it may be a transverse engine, i.e. an engine installed such that the crankshaft of the engine is perpendicular to the direction of straight travel of the vehicle. This may be the case e.g. in a bus, where the engine may be a transverse engine mounted in the rear of the bus. The cylinders include first cylinders 301 which are the three cylinders located forward in the vehicle direction of forward travel, and second cylinders 302 which are the three cylinders located rearward in the vehicle direction of forward travel.

The vehicle operation system further comprises a pneumatic system 660 comprising a vehicle air brake system. Alternatively or in addition, the pneumatic system 660 may comprise another system, such as a vehicle air suspension system. The air brake system comprises an air compressor 673, which may be arranged to be driven by the crankshaft of the engine 1, or by any other suitable means, such as an electric motor. The air compressor 673 is arranged to compress air taken in from the atmosphere via a suitable air duct. The air compressor 673 may receive the air directly from the atmosphere, of via another air treatment device, such as a further compressor. The compressor 673 is connected to a compressed air storage tank 664, and is thereby arranged to deliver the compressed air to the air storage tank 664. A control device 665, in this example in the form of a driver's brake pedal, is arranged to actuate brake control valves 666, 667 for front and rear wheel brakes 668, 669, respectively. Release valves 671, 672 are arranged to release the pressure in the front and rear wheel brake circuits, respectively.

An air guide 901 is arranged to guide air from the atmosphere to the cylinders 301, 302 of the engine 1. An exhaust guide 500, 501, 502 is arranged to guide exhaust gases from the cylinders to the atmosphere. As detailed below, the exhaust guide presents first and second exhaust guide branches 501, 502, each arranged to guide exhaust gases from the first and second cylinders 301, 302, respectively.

At each of the cylinders 301, 302 one, two or more intake valves (not shown) are provided to control the admission of air from the air guide 901 to the respective cylinder 301, 302. Also, at each of the cylinders one, two or more exhaust valves (not shown) are arranged to control a communication between the respective cylinder 301, 302 and the respective exhaust guide branch 501, 502. The engine 1 comprises an exhaust valve actuation assembly 8 comprising a camshaft arrangement comprising a rotatable camshaft 801 arranged to be driven by the crankshaft. At each cylinder 301, 302 a cam lobe 803 is fixed to the camshaft for actuation of the exhaust valves. The exhaust valve actuation assembly 8 comprises for each cylinder 301, 302 a rocker arm (not shown) arranged to pivot by contact at one end with the respective cam lobe 803 to actuate the exhaust valves. As suggested, the invention is equally applicable to a camless engine.

Also, a fuel system (not shown) is provided to inject fuel into the cylinders during cycles thereof, and the fuel injection is controllable by the control unit 21. It should be noted that the invention is equally applicable to engines in which the fuel system is arranged to inject fuel outside of the cylinders, e.g. port injected engines.

The engine 1 comprises a turbocharger 4 comprising a turbine 401 in the exhaust guide 500.

The turbocharger 4 also comprises a compressor 402 in the air guide 901. A charge air cooler 902 may be provided in the air guide 901 between the compressor 402 and the cylinders 301, 302. The turbine 401 and the compressor 402 are fixedly connected and rotatable, whereby the turbine 401 is arranged to be driven by gases in the exhaust guide 500, to drive the compressor 402 which is arranged to compress air in the air guide 901, as in known per se.

In some implementations of the invention, the engine may be comprise a plurality of turbochargers. As suggested, the turbine may in some implementations of the invention be one of a plurality of turbines, and/or a turbine of a turbo compound device. As also suggested the invention is equally applicable to naturally aspirated engines.

The first exhaust guide branch 501 is arranged to guide a gas flow from the first cylinders 301 to the turbine 401, and the second exhaust guide branch 502 is arranged to guide a gas flow from the second cylinders 302 to the turbine 401. Thereby, the flow from the second cylinders 302 to the turbine 401 is kept separate from the flow from the first cylinders 301 to the turbine. At the turbine 401 the exhaust guide branches 501, 502 are joined whereby the exhaust gases are guided in an integrated portion 500 of the exhaust guide downstream of the turbine 401. It should be noted that the invention is equally applicable to engines where a single conduit of the exhaust guide is arranged to guide a gas flow from all cylinders of the engine to the turbine.

A control unit 21 is arranged to control the operation system as described below.

An air conduit 661 connects the pneumatic system 660 with the exhaust guide. More specifically, the air conduit 661 connects the air storage tank 664 with the second exhaust guide branch 502. An air valve 662, controllable by the control unit 21, is provided for selectively controlling a flow of compressed air from the air storage tank 664 into the second exhaust guide branch 502. Thereby, a junction 663 of the air conduit 661 and the second exhaust guide branch 502 is located upstream of the turbine 401.

In alternative embodiments, the air conduit 661, or a pair of air conduits, may connect the air storage tank 664 with the first exhaust guide branch 501 as well as the second exhaust guide branch 502. In further embodiments, the air conduit 661 may connect the air storage tank 664 with the first exhaust guide branch 501 but not with the second exhaust guide branch 502.

The vehicle operation system also comprises downstream of the turbine 401 an exhaust after treatment system 7 for treating exhaust gases from the engine 2. The exhaust guide 500 is arranged to convey exhaust gases from the engine 2, as indicated by the arrow 702. Three exhaust after treatment devices 705, 714, 716 are located sequentially in the exhaust guide 500. A first of the exhaust after treatment devices is a selective catalytic reduction (SCR) catalyst 705 for selectively reducing NOx contained in the exhaust gas. The exhaust after treatment system 7 further comprises means 711 for supplying a reductant, e.g. urea or ammonia, into the exhaust guide 500 upstream of the SCR catalyst 705, for the NOx reduction process in the SCR catalyst. A second of the exhaust after treatment devices, located upstream of the SCR catalyst 705 and upstream of the reductant supply means 711, is an oxidation catalyst (DOC) 714 having the function of oxidizing carbon monoxide (CO), hydrocarbons (HC) and nitrogen monoxide (NO) contained in the exhaust gases. A third of the exhaust after treatment devices is a diesel particulate filter (DPF) 716, disposed downstream of the DOC 714 and upstream of the reductant supply means 711, for capturing and collecting particulate matter contained in exhaust gas. It is understood that the exhaust after treatment system 7 may be configured in other manners, and/or include other components.

Means 221 for determining the temperature of the SCR catalyst 705 is provided in the form of an SCR temperature sensor 221 at the SCR catalyst 705, adapted to provide signals to the control unit 21. Means 222 for determining the temperature of the DPF 716 is provided in the form of a DPF temperature sensor 222 at the DPF 716, adapted to provide signals to the control unit 21. Alternatively or additionally such a temperature sensor may be provided at the DOC 714, or at some other suitable location in the exhaust guide 500 for determining the temperature of one or more of the exhaust after treatment devices 705, 714, 716. For example, one or more temperature sensors may be provided upstream of, or between the exhaust after treatment devices. Alternatively or in addition, a numerical model may be used for determining the temperature of one or more of the exhaust after treatment devices 705, 714, 716, as is known per se.

The engine in this embodiment comprises the following devices for providing an engine braking torque of the engine:

An adjustable exhaust flow restriction element 601 in the form of an exhaust throttle valve is arranged in the exhaust guide 500, downstream of the turbine 401 and upstream of the exhaust after treatment system 7. The exhaust flow restriction element 601 is controllable by the control unit 21 via a respective exhaust flow restriction actuation assembly (not shown) comprising e.g. a stepper motor. It should be noted that alternatives for the actuation of the exhaust flow restriction element 601 are possible, such as pneumatic actuation. During engine braking, the exhaust flow restriction element is at least partly closed, so as to increase the pressure upstream of the exhaust flow restriction element 601. The exhaust flow restriction element 601 is arranged to provide a plurality of levels of the exhaust flow restriction depending on the adjustment by the control unit 21.

In alternative embodiments, a valve of an exhaust flow restriction element 601 may be integrated in the housing of the turbine 401. In further embodiments, the turbocharger 4 may be a variable geometry turbocharger, whereby the turbocharger 4 provides, with a flow adjusting function at the turbine 401, the function of the exhaust flow restriction element 601.

Each cam lobe 803 in the respective cylinder 301, 302 presents a relatively large main nose (not shown) for exhaust opening sequences in the cycles of the respective cylinder. As described in U.S. Pat. No. 5,146,890A, incorporated herein by reference, each cam lobe 803 further presents two relatively small noses (not shown), i.e. a decompression nose and a charge nose. When the engine propels the vehicle, a distance is provided between on one hand the rocker arm and on the other hand the decompression nose and the charge nose, whereby the decompression nose and the charge nose do not provide any exhaust valve actuation. During engine braking, each rocker arm is in contact with the respective decompression nose and the respective charge nose. The selective engagement of the decompression nose and the charge nose is provided by a hydraulic piston, controlled by a hydraulic conduit system, on the rocker arm. The control of the hydraulic piston is provided by the control unit 21.

Each charge nose provides a charge opening sequence, which is commenced in a second half of an intake stroke of the respective cylinder. Thereby, when the piston is at its bottom dead centre and the compression stroke is about to start, the exhaust valves open for a short period and the higher pressure in the exhaust guide 500, provided by the exhaust flow restriction element 601, "charges" the cylinder. As a result of this, the braking effect on the piston during the compression stroke will be increased. Further during engine braking, the decompression nose provides a decompression opening sequence, which is commenced in a compression stroke of the respective cylinder, and which serves to release air compressed during the compression stroke, whereby a push-back effect on the piston is avoided.

The exhaust flow restriction element 601 and the decompression and charge noses of the cam lobes 803, described above, are examples of solutions for providing an engine braking torque of the engine. It is understood however that other solutions may be provided for providing an engine braking torque of the engine.

Figure 3:
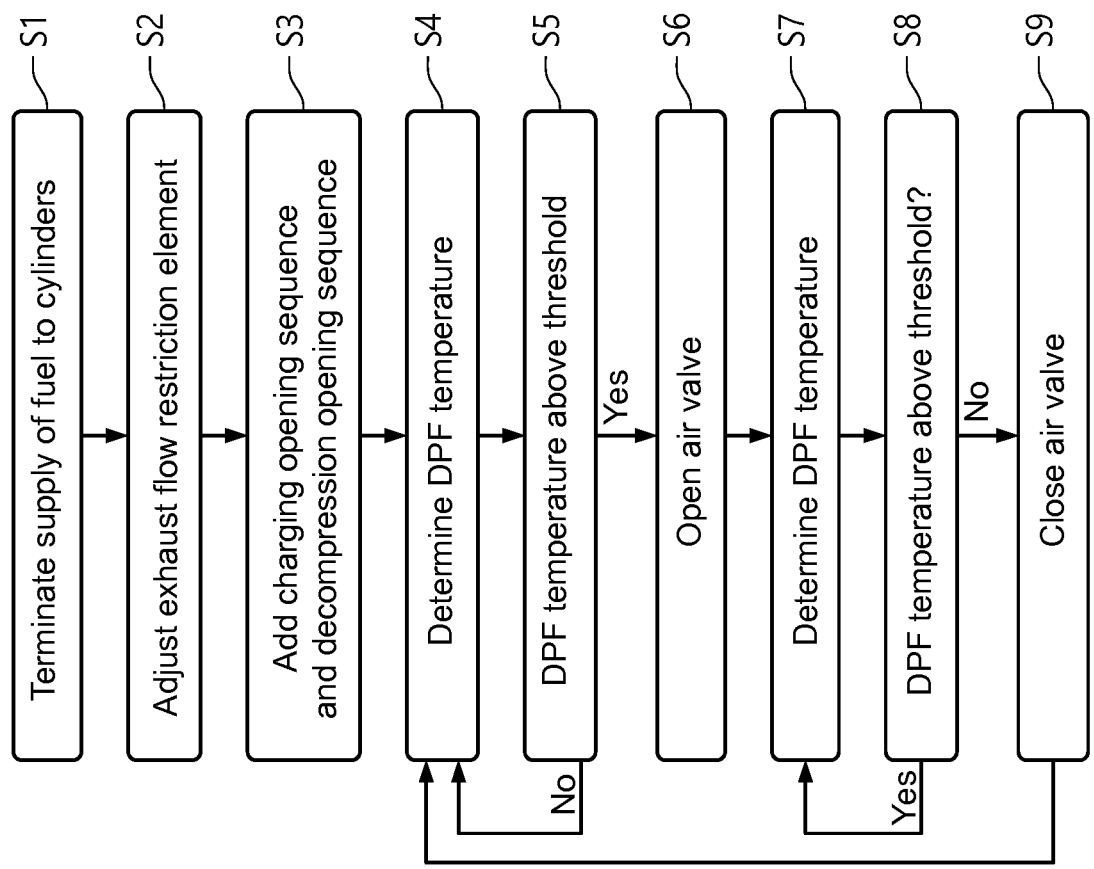
FIG. 3 is a block diagram depicting steps in a method of controlling the system in FIG. 2.

With reference to FIG. 3 a method of controlling the vehicle operation system to provide an engine braking torque will be described.

For providing engine braking, the supply of fuel to the cylinders 301, 302 is terminated S1. Further, the exhaust flow restriction element 601 is adjusted S2 so as to restrict the flow through the exhaust guide 500. In addition, the cylinder exhaust valve actuation assembly 8 is adjusted S3 as described above so as to provide the charge opening sequence and the decompression opening sequence.

During engine braking, the temperature of the DPF 716 is determined S4 by means of the DPF temperature sensor 222. The determined temperature is compared S5 to a threshold value. If the determined DPF temperature is above the threshold value, the air valve 662 is opened S6. Thereby the supply of air from the air compressor 664 will cool the gases flowing through the exhaust guide 500 so as to cool the exhaust after treatment devices 705, 714, 716.

While the air valve is kept open, the temperature of the DPF 716 is still determined S7, and the determined temperature is compared S9 to the threshold value. If the determined the DPF temperature is below the threshold value, the air valve 662 is closed S9.

Figure 4:
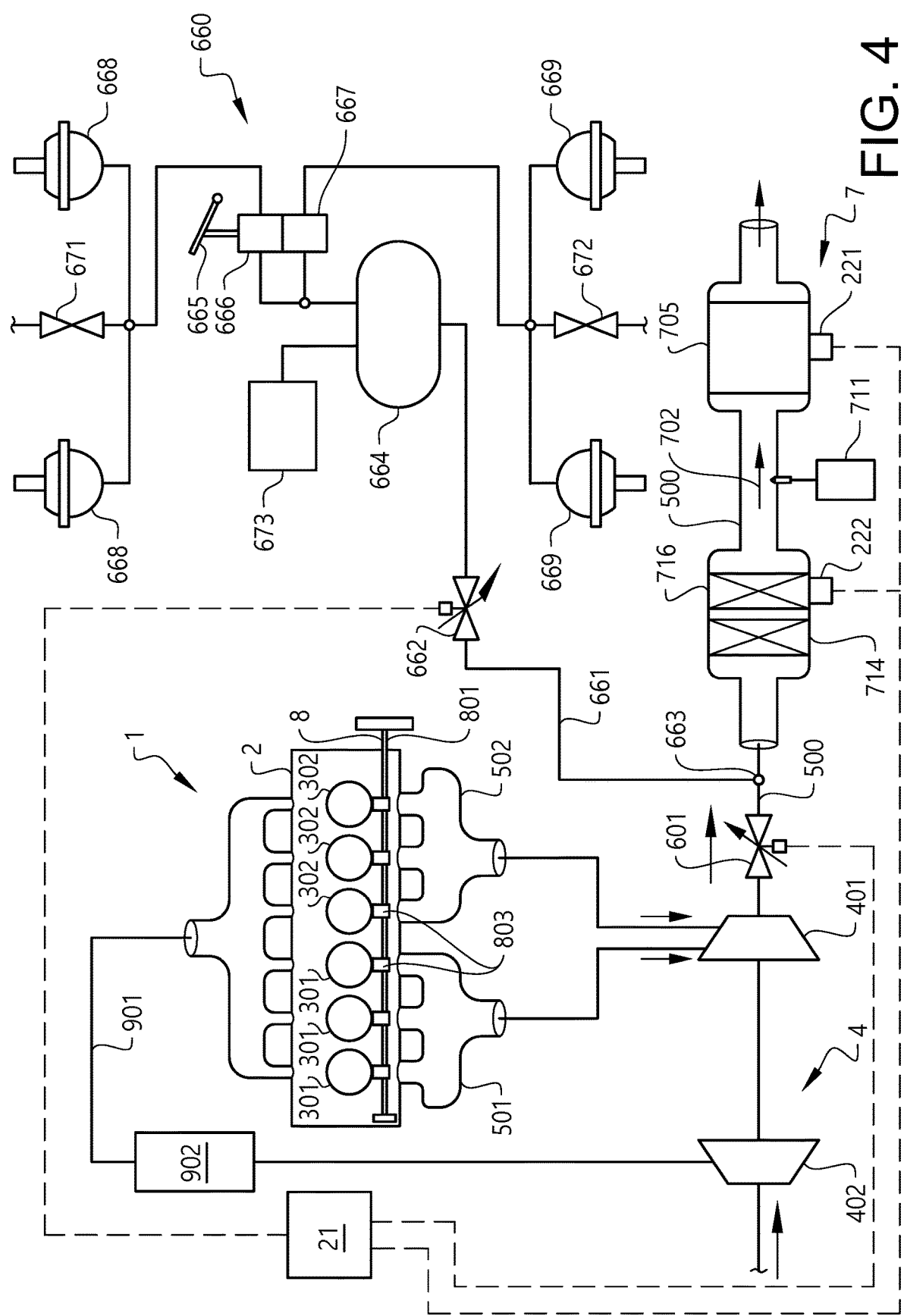
FIG. 4 is a schematic drawing of a vehicle operation system according to an alternative embodiment of the invention.

FIG. 4 shows a vehicle operation system according to an alternative embodiment of the invention, differing from the system described with reference to FIG. 2 only regarding the following feature: The air conduit 661 connects the air storage tank 664 with the exhaust guide 500, whereby a junction 663 of the air conduit 661 and the exhaust guide 500 is located downstream of the turbine 401 and the exhaust flow restriction element 601, but still upstream of the exhaust after treatment system 7. In alternative embodiments, the junction 663 of the air conduit 661 and the exhaust guide 500 is located downstream of the turbine 401 but upstream of the exhaust flow restriction element 601.

Figure 5:
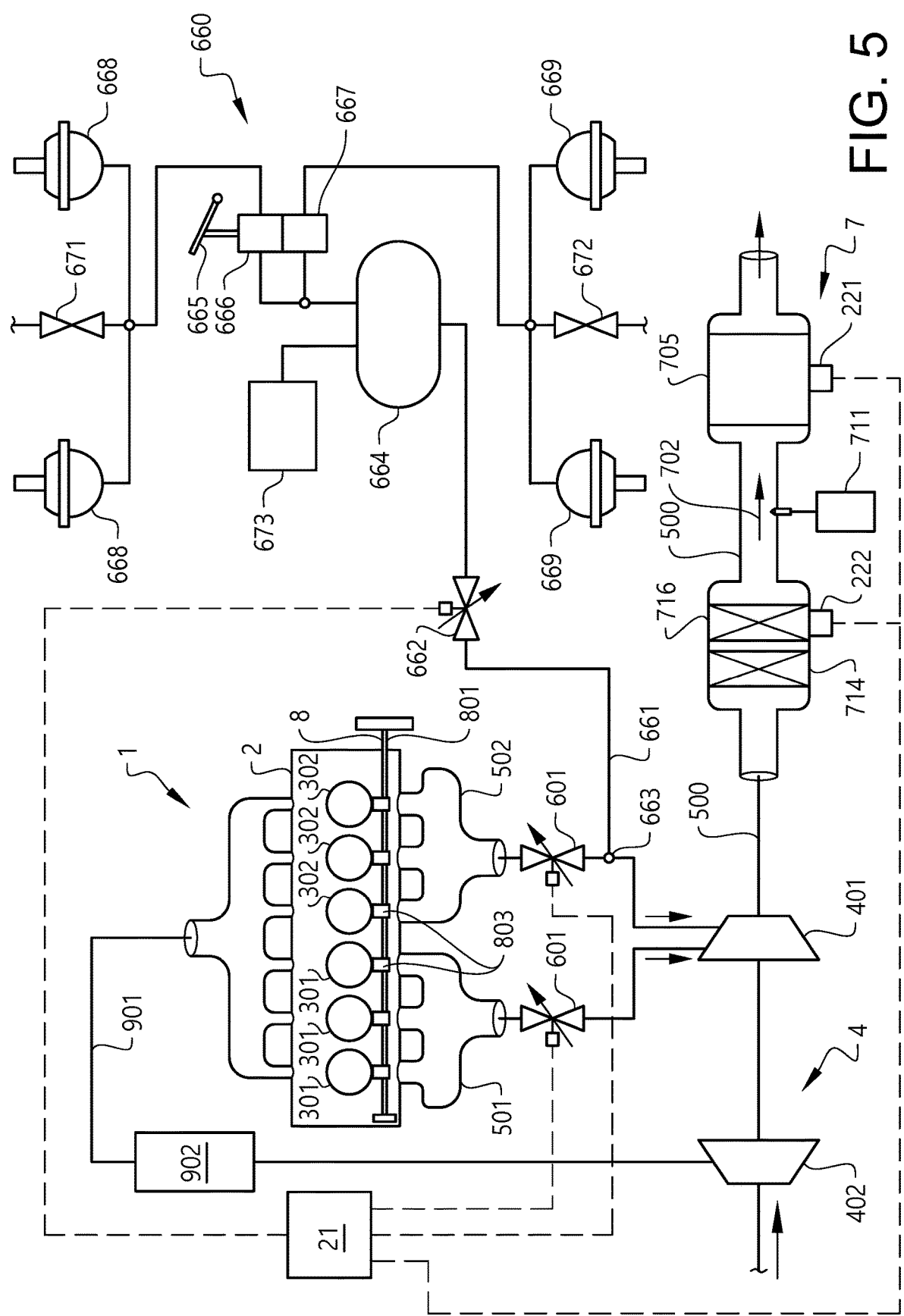
FIG. 5 is a schematic drawing of a vehicle operation system according to another embodiment of the invention.

FIG. 5 shows a vehicle operation system according to a further embodiment of the invention, differing from the system described with reference to FIG. 2 only regarding the following feature: An exhaust flow restriction element 601 is provided in each of the first and second exhaust guide branches 501, 502. The air conduit 661 connects the air storage tank 664 with the second exhaust guide branch 502, downstream of the exhaust flow restriction element 601 in the second exhaust guide branch 502.

FIG. 6 shows a vehicle operation system according to another embodiment of the invention. The system comprises an engine with a cylinder 301, and an exhaust guide 500 being arranged to guide a gas flow from the cylinder 301 to the atmosphere. The system further comprises a pneumatic system 660, and an air conduit 661 connecting the pneumatic system 660 with the exhaust guide 500 for allowing a flow of compressed air from the pneumatic system into the exhaust guide 500.

It is to be understood that the present invention is not limited to the embodiments described above and illustrated in the drawings; rather, the skilled person will recognize that many changes and modifications may be made within the scope of the appended claims.

The invention claimed is:

1. A method of controlling an operation system of a vehicle, comprising an internal combustion engine for propulsion of the vehicle, the engine comprising a cylinder arranged to compress air from an atmosphere received via an air guide, the engine further comprising an exhaust guide arranged to guide a gas flow from the cylinder to the atmosphere, the method comprising:

controlling the engine to provide a braking torque, controlling, during the control of the engine to provide a braking torque, an air valve to allow a flow of compressed air from a compressed air source other than the cylinder via an air conduit into the exhaust guide, controlling the engine to provide a braking torque comprises controlling an adjustable exhaust flow restriction element so as to restrict the flow through the exhaust guide and determining a temperature of an exhaust after treatment device located in the exhaust guide, wherein controlling the air valve comprises controlling the air valve in dependence on the determined exhaust after treatment device temperature.

2. A method according to claim 1, characterized in that the compressed air source is a pneumatic system of the operation system.

3. A method according to claim 1, wherein the compressed air source is a pneumatic system, of the operation system, wherein the pneumatic system comprises a vehicle air brake system, and/or a vehicle air suspension system, or the pneumatic system is a vehicle air brake system or a vehicle air suspension system.

4. A control unit configured to perform the steps of the method according to claim 1.

5. A vehicle comprising a control unit according to claim 4.

6. A computer program comprising program code which, when run on a computer, cause the computer to perform a method controlling an operation system of a vehicle, comprising an internal combustion engine for propulsion of the vehicle, the engine comprising a cylinder arranged to compress air from an atmosphere received via an air guide, the engine further comprising an exhaust guide arranged to guide a gas flow from the cylinder to the atmosphere, the method comprising:

controlling the engine to provide a braking torque, controlling, during the control of the engine to provide a braking torque, an air valve to allow a flow of compressed air from a compressed air source other than the cylinder via an air conduit into the exhaust guide, controlling the engine to provide a braking torque comprises controlling an adjustable exhaust flow restriction element so as to restrict the flow through the exhaust guide and determining a temperature of an exhaust after treatment device located in the exhaust guide, wherein controlling the air valve comprises controlling the air valve in dependence on the determined exhaust after treatment device temperature.

\* \* \* \* \*